Single Stage Extraction of
Phenols from Na₃PO₄ Solutions with MIBK

Effect of Temperature on pH of $Na_3PO_4$ Solutions

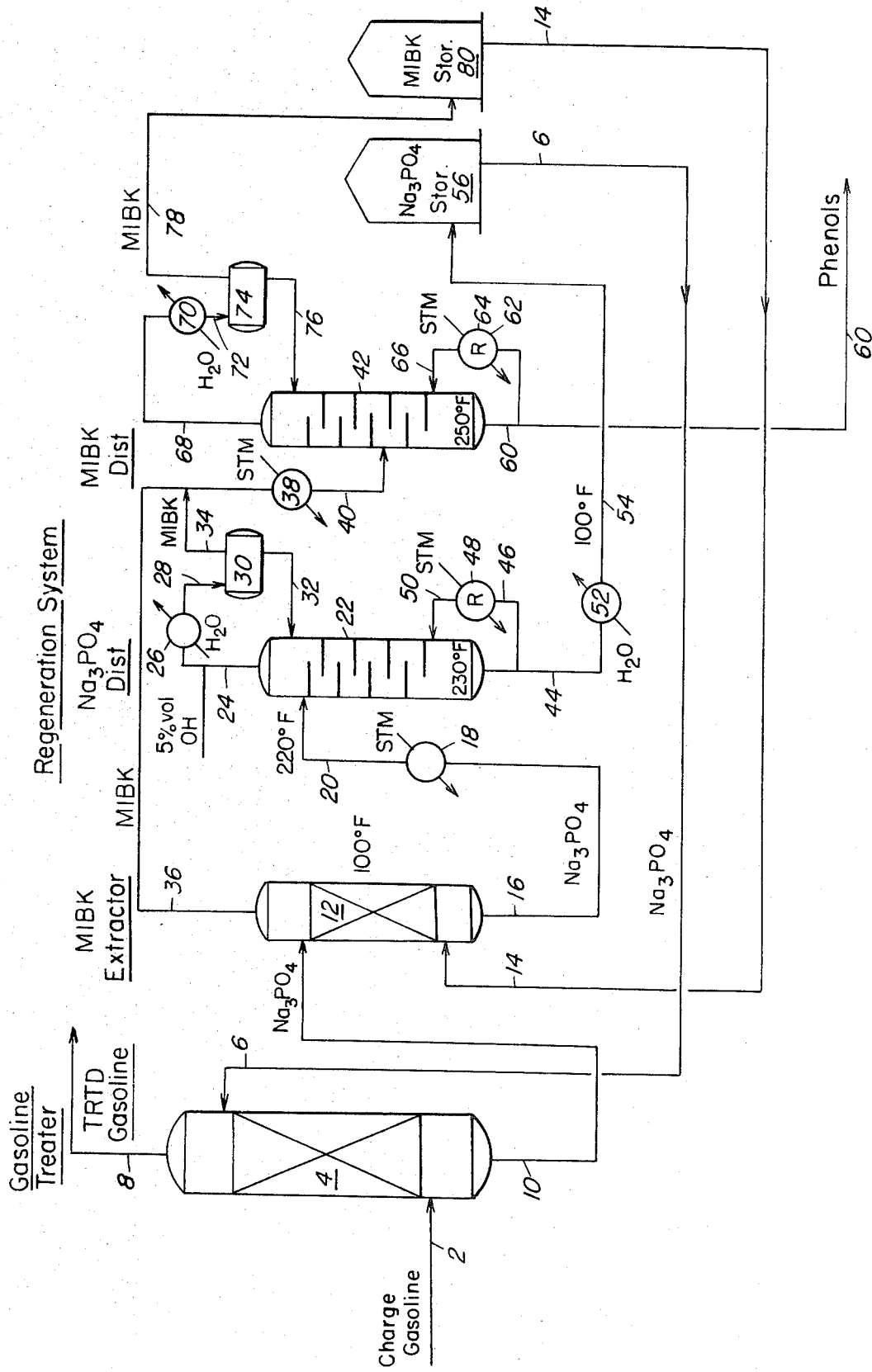

United States Patent Office 3,775,306
Patented Nov. 27, 1973

3,775,306
SOLVENT REMOVAL OF PHENOLS FROM CATA-
LYTIC GASOLINE AND SOLVENT RECOVERY
Kenneth F. Hayden, Round Pond, Maine, assignor to
Mobil Oil Corporation
Filed July 19, 1972, Ser. No. 273,249
Int. Cl. C10g 27/04
U.S. Cl. 208—263                                    10 Claims

ABSTRACT OF THE DISCLOSURE

A non-caustic regenerative process for removing phenols from gasoline is described. The process employs an aqueous solution of tri-sodium phosphate which is regenerated by extraction to remove phenols therefrom by contact with methyl isobutyl ketone. Methyl isobutyl ketone is regenerated by distillation to separate phenols.

BACKGROUND OF THE INVENTION

Figure 1:
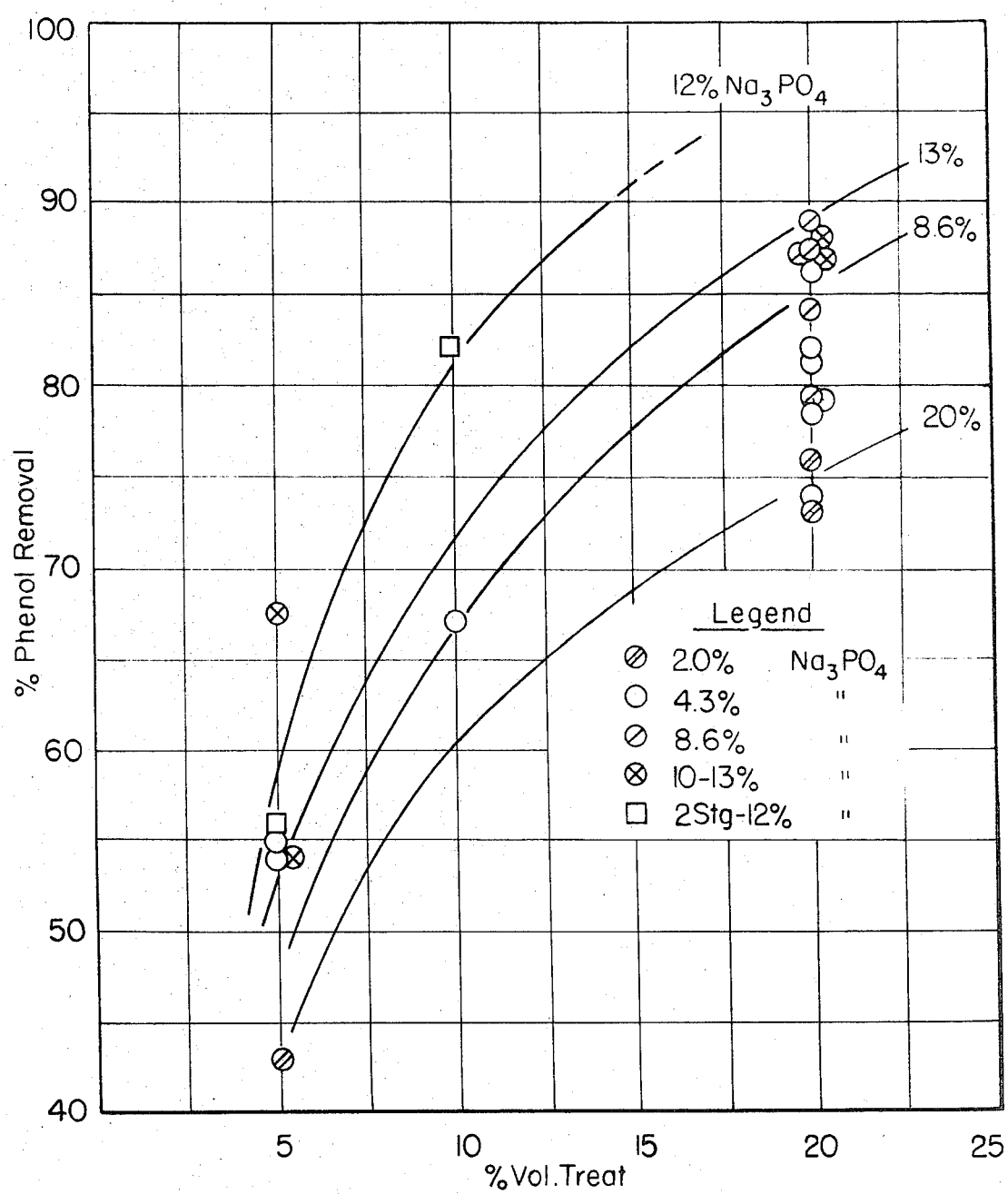

Sulfur is undesirable in gasolines and distillate fuels. Hydrogen sulfide and mercaptans are especially undesirable because they have objectionable odor. This is also true to some extent with large amounts of phenols in gasoline product of catalytic cracking. Furthermore sulfur compounds lower the octane rating of a loaded gasoline; thus removal of mercaptans therefrom is most desirable. Phenols on the other hand may or may not be desirable in a gasoline product but when recovered in sufficient purity may be desirably employed in other processes as starting materials. Thus the present invention is concerned with the removal of aliphatic mercaptans and phenols including thiophenols from a gasoline product of catalytic cracking.

THE INVENTION

The present invention is concerned with the removal of phenols, thiophenols and mercaptans from the gasoline product of catalytic cracking. In one aspect it relates to the recovery of solvent employed in the process for the separation of phenols and thiophenols as by extraction. In another aspect the present invention is concerned with a combination of processing steps suitable for the removal of mercaptans, thiophenols and phenols from catalytic gasoline product. The present invention is directed in a particular aspect to the removal of phenols and thiophenols from catalytic gasoline by contact with a tri-sodium phosphate solution and thereafter regenerating by extraction the phosphate solution by contact with methyl isobutyl ketone to remove phenols therefrom which in turn is recovered from phenols for reuse by distillation. The combination of this invention has significance as an alternate to the now used caustic extraction methods with their attendant spent caustic disposal problems.

In the method of this invention, a non-caustic regenerative process relying upon extraction technology is defined for the removal of phenols and thiophenols hereinafter generally referred to as phenols and distinguishable from aliphatic mercaptans at a level in the range of 70 to about 80%. Of course the extent of phenol removal will depend upon the phenol content of the catalytic gasoline, that is, the gasoline product of catalytic cracking as well as the number of stages of contact and the phosphate solution treat ratio. In the environment of this invention, the phosphate solution treat ratio will generally be in the range of from 5 to 20% by vol. per volume of gasoline and preferably less than about 15% by volume. Knowing the phenol extraction coefficients for various tri-sodium phosphate solutions will further assist with establishing optimum treating conditions. In the extraction complex of this invention, aliphatic mercaptans are initially removed from the cracked gasoline product to sweeten the gasoline as by Merox treating known in the industry and thereafter a phosphate solution is relied upon to remove phenols from the gasoline and phosphate solution containing phenols is thereafter contacted with a solvent suitable for removing phenols from the phosphate solution. MIBK has been found most acceptable for this purpose and is best accomplished at a temperature of about 100° F. Knowing the phenol extraction coefficients for MIBK will further assist with optimizing this operation. To accomplish this end it has been found that several stages of extraction in countercurrent equipment is desirable for maximum phenol removal efficiency from the phosphate solution.

In the studies leading to the concepts of this invention several solvents have been tested for their efficiency in removing phenols from gasolines and for regenerating those phosphate solutions found most desirable. Solvents tested for phenol removal from gasoline includes tri-sodium phosphate, tri-potassium phosphate and methanol/water solutions. Tri-potassium phosphate was less effective for phenol removal from gasoline than the tri-sodium phosphate. See Table 1a. The tri-sodium phosphate solutions being mildly alkaline and having a pH of about 12.5 were found most acceptable for the process of this invention. The pH of tri-sodium phosphate solutions used may be in the range of from about 11 to about 13. The higher strength tri-sodium phosphate ($Na_3PO_4$) solutions are more favorable for phenol extraction. However its strength is limited to a maximum solubility of about 13% tri-sodium phosphate in water at 100° F.

DISCUSSION OF SPECIFIC EMBODIMENTS

The treating of gasoline product of cracking with phosphate solutions may be accomplished in more than one stage of contact. In general, single stage treating will remove from 80 to 90% of the phenols using a treat ratio of 15 to 20 volumes of phosphate solution per 100 volumes of gasoline. On the other hand, two stage treating will reduce the treat ratio for equivalent phenol removal and vice versa.

Data obtained for the removal of phenols from catalytic gasoline with tri-sodium phase is provided in Table 1b and represented by the curves of FIG. 1.

It will be observed from Table 1a that the aliphatic mercaptans were not removed to any great extent whereas the thiophenols were successfully removed. Furthermore, for the tri-potassium phosphate to match the tri-sodium phosphate solution in phenol removal much larger volumes of the solution are required. This of course detracts from the suitability of tri-potassium phosphate as a satisfactory phenol extraction solvent.

TABLE 1a.—PHENOL REMOVAL FROM GASOLINE WITH PHOSPAHTE SOLUTIONS

|  | | $Na_3PO_4$ | | | $K_3PO_4$ | | |
|---|---|---|---|---|---|---|---|
| Na₃ or K₃PO₄, wt. percent |  | 10 |  | 10 | 20 | 40 | |
| Solution, pH |  | 12.7 |  | 12.1 | 12.4 | 12.4 | |
| Temperature, °F |  | 80 |  |  | 80 |  | |
| Treat ratio, vol. percent of gasoline | None | 10 | 20 | 100 | 10 | 20 | 10 | 20 |
| Gasoline: |  |  |  |  |  |  |  |  |
| Aliphatic mercaptans, p.p.m | 28.3 | 26 | 25 | 13 | 28 | 26 | 28 | 28 |
| Phenols, p.p.m | 2,600 | 900 | 500 | 400 | 1,200 | 900 | 1,400 | 1,300 |
| Thiophenols, p.p.m | 22 | 8 | 9 |  | <1 | <1 |  |  |
| Phenols removal, percent |  | 65 | 83 | 84 | 54 | 65 | 46 | 50 |

TABLE 1b.—PHENOL REMOVAL FROM CATALYTIC GASOLINE WITH TRI-SODIUM PHOSPHATE SOLUTIONS

| | Na₃PO₄ solution | | Treat ratio, percent vol. | Temp., °F. | Mix time, min. | Phenols | | | | Phenol removal, percent wt. |
|---|---|---|---|---|---|---|---|---|---|---|
| | | | | | | Gasoline | | Na₃PO₄ | | |
| | Percent wt. Na₃PO₄ | pH | | | | Charge, p.p.m. | Product, p.p.m. | Charge, percent wt. | Product, percent wt. | |
| Single stage extraction: | | | | | | | | | | |
| Run Number: | | | | | | | | | | |
| 1 | 2.0 | | 5 | 100 | 15 | 1,300 | 793 | | 0.74 | 43 |
| 2 | 2.0 | 12.4 | 20 | 100 | 15 | 2,200 | 600 | | 0.59 | 73 |
| 3 | 2.0 | 12.4 | 20 | 10 | 15 | 1,300 | 310 | | 0.38 | 76 |
| 4 | 5.0 | | 5 | 100 | 15 | 1,300 | 585 | | 0.93 | 55.0+ |
| 5 | 4.3 | | 5 | 100 | 30 | 2,600 | 1,200 | | | 53.9 |
| 6 | 4.3 | | 20 | 100 | 30 | 2,600 | 464 | | 1.0 | 82.2 |
| 7 | 4.3 | | 20 | 100 | 15 | 2,300 | 405 | | 0.63 | 82.0 |
| 8 | 4.3 | 12.2 | 20 | 100 | 15 | 2,200 | 474 | | 0.63 | 78.5 |
| 9 | 5.4 | | 20 | 100 | 15 | 1,300 | 243 | | 0.37 | 81.3+ |
| 10 | 8.6 | | 10 | 10 | 15 | 1,000 | 329 | | | 67 |
| 11 | 8.6 | | 20 | 100 | 15 | 1,000 | 211 | | | 79 |
| 12 | 8.6 | | 5 | 100 | 30 | 2,600 | 2,100 | | 0.72 | 12.5 |
| 13 | 8.6 | | 10 | 100 | 30 | 2,600 | 1,400 | | | 41.7 |
| 14 | 8.6 | | 20 | 100 | 30 | 2,600 | 300 | | | 87.5 |
| 15 | 8.6 | | 20 | 100 | 15 | 2,200 | 250 | | 0.63 | 89 |
| 16 | 8.6 | 12.5 | 20 | 100 | 15 | 2,200 | 280 | | 0.66 | 87 |
| 17 | 8.6 | 12.5 | 20 | 100 | 15 | 1,300 | 170 | | 0.37 | 87 |
| 18 | 8.6 | | 20 | 100 | 15 | 2,200 | 470 | | 0.63 | 79 |
| 19 | 8.6 | 12.4 | 20 | 100 | 15 | 990 | 196 | | 0.31 | 80 |
| 20 | 8.6 | | 20 | 100 | 15 | 2,200 | 580 | 0.5 | ¹1.01 | 74 |
| 21 | 8.6 | | 20 | 100 | 15 | 5,100 | 1,100 | 1.0 | ²1.35 | 79 |
| 22 | 10.0 | | 5 | 100 | 15 | 1,300 | 472 | | 1.02 | 67.5 |
| 23 | 10.0 | | 20 | 100 | 15 | 1,300 | 177 | | 0.45 | 86.5 |
| 24 | 13 | | 5 | 100 | 30 | 2,600 | 1,200 | | | 54.0 |
| 25 | 13 | | 20 | 100 | 30 | 2,600 | 309 | | 0.80 | 88.2 |
| Countercurrent 2 stage extraction: | | | | | | | | | | |
| N | 12 | 12+ | 5 | 100 | 15 | 36,00 | 16.00 | 0 | 2.2 | 56 |
| O | 12 | 12+ | 10 | 100 | 15 | 36,00 | 646 | 0 | 1.69 | 82 |

¹ 0.5% phenols added to solution before treat.
² 1.0% phenols added to solution before treat.

Solvents examined for removal of phenols from the phosphate solutions included acetates, ethers and ketones. Methyl iso-butyl ketone (MIBK) was found to be more suitable than n-butyl acetate and ethers because of its stability under the conditions of operation and better phenol removal efficiency.

The data obtained in the removal of phenols from the tri-sodium phosphate solutions by single stage extraction with MIBK is shown in Table 2 below and represented in FIG. 2.

to about 65% was obtained at 100% volume treat. However, a phenol removal of about 85% or more could be expected with 3–4 countercurrent stages of extraction. Thus for maximum phenol removal efficiency from the phosphate solutions, countercurrent extraction equipment should be used.

Stability of the tri-sodium phosphate solution was studied by repeated regeneration with MIBK at 200° F. The results of these studies are presented in Table 3

TABLE 2.—EXTRACTION OF PHENOLS FROM Na₃PO₄ SOLUTION WITH METHYL ISO-BUTYL KETONE¹

| Experiment number | Na₃PO₄ solution charge | | | | Extraction with MIBK | | | Na₃PO₄ product | | Phenols removed by MIBK, percent wt. Na₃PO₄ |
|---|---|---|---|---|---|---|---|---|---|---|
| | Na₃PO₄ | | Phenols | | Vol. percent Na₃PO₄ | Temp., °F. | Mix, min. | Phenols, percent wt. | pH³ | |
| | Percent wt. | pH | Percent wt. | pH² | | | | | | |
| 1 | 5 | 12.4 | 0.96 | 12.0 | 20 | 100 | 15 | .64 | 12.2 | 33 |
| 2 | 2 | 12.4 | 0.53 | 12.0 | 20 | 100 | 15 | .33 | 12.1 | 38 |
| 3 | 2 | 12.4 | 1.40 | 11.1 | 20 | 100 | 15 | .64 | 11.9 | 54 |
| 4 | 5 | | 1.0 | | 50 | 100 | 15 | .51 | | 49 |
| 5 | 5 | | 1.93 | | 50 | 100 | 15 | .76 | | 61 |
| 6 | 5 | | 1.93 | | 50 | 150 | 15 | .82 | | 58 |
| 7 | 2 | 12.4 | 0.91 | 11.5 | 50 | 100 | 15 | .39 | 12.1 | 57 |
| 8 | 5 | 12.2 | 0.46 | 12.2 | 50 | 100 | 15 | .26 | 12.4 | 43 |
| 9 | 5 | 12.4 | 0.96 | 12.0 | 100 | 100 | 15 | .35 | 12.3 | 64 |
| 10 | 5 | | 1.0 | | 100 | 100 | 15 | .37 | | 67 |
| 11 | 5 | | 1.0 | | 10 | 200 | 15 | .83 | 12.0 | 17 |
| 12 | 5 | | 1.0 | | 20 | 190 | 15 | .70 | | 30 |
| 13 | 5 | 12.4 | 0.96 | 12.0 | 20 | 200 | 15 | .71 | 12.2 | 26 |
| 14 | 5 | | 1.0 | | 30 | 200 | 15 | .72 | 12.0 | 28 |
| 15 | 5 | | 1.0 | | 50 | 200 | 15 | .51 | | 49 |
| 16 | 5 | | 1.93 | | 50 | 200 | 15 | .92 | | 53 |
| 17 | 5 | 12.5 | 1.07 | 12.1 | 100 | 200 | 15 | .41 | 12.3 | 63 |
| 18 | 5 | 12.3 | 1.44 | 11.9 | 100 | 200 | 15 | .54 | 12.2 | 63 |
| 19 | 5 | 12.2 | 1.47 | 11.9 | 100 | 200 | 15 | .53 | 12.2 | 64 |
| 20 | 5 | 12.2 | 1.59 | 11.7 | 100 | 200 | 15 | .57 | 12.2 | 65 |
| 21 | 5 | 12.2 | 1.79 | 11.8 | 100 | 200 | 15 | .59 | 12.1 | 67 |
| 22 | 5 | 12.1 | 0.59 | 12.1 | 100 | 200 | 15 | .26 | 12.2 | 56 |

¹ Single-stage extraction.
² pH after addition of phenols.
³ After extraction with MIBK.

Figure 3:
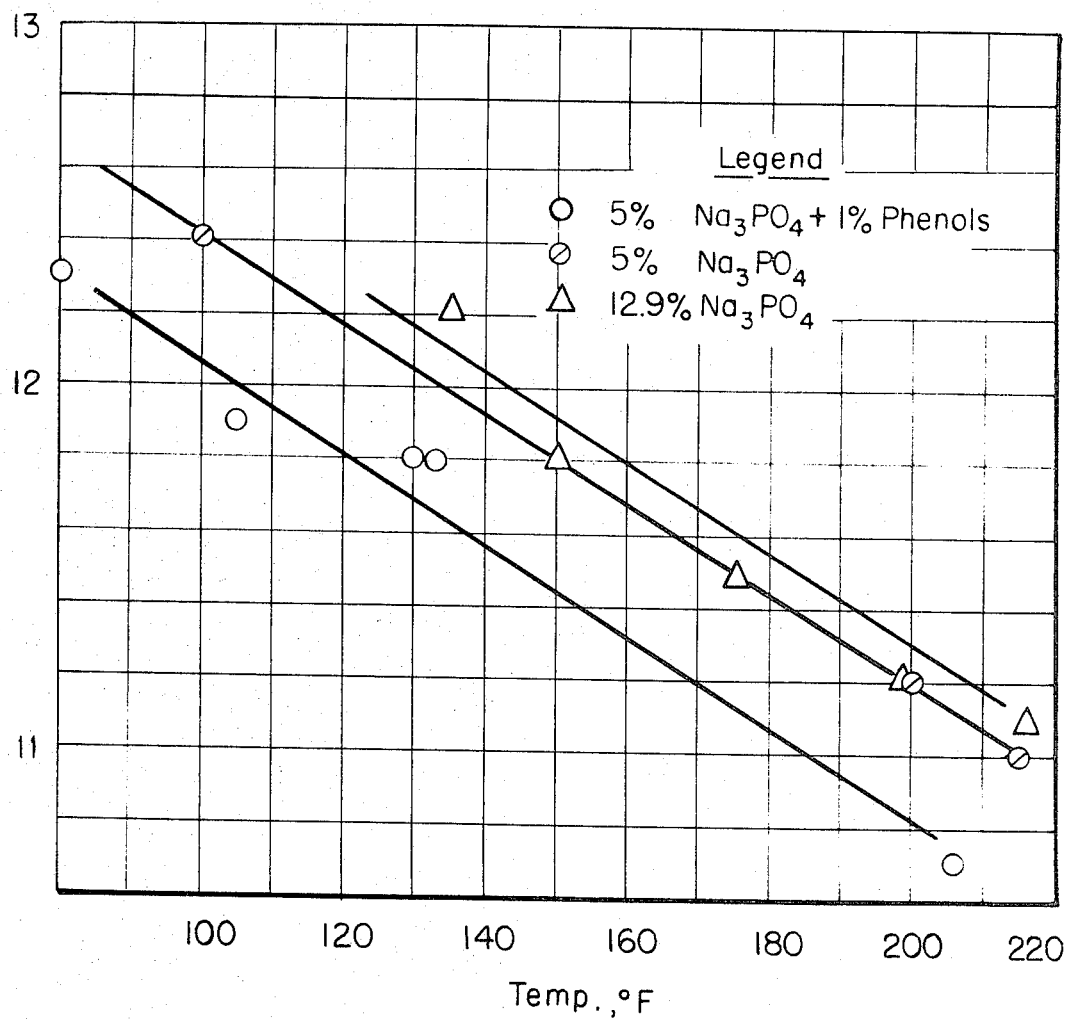

It was found in the studies developing the data presented herewith that optimum phenol removal and extraction coefficients for the MIBK extraction of phenols from the preferred phosphate solutions is attained at about 100° F. For single stage, removal of phenol up to about 65% was obtained at 100% volume treat. Howbelow. It is observed that no apparent reaction of the tri-sodium phosphate with MIBK or change in pH occurred during the several cycles of regeneration. However, the effect of temperature on pH of the tri-sodium phosphate solution is shown in FIG. 3.

TABLE 3

Extraction of Phenols from Na₃PO₄ at 200° F. with MIBK

| Regeneration stage | 1 | 2 | 3 | 4 | 5 | 6 |
|---|---|---|---|---|---|---|
| Na₃PO₄ soln., percent wt | 5.0 | 5.0 | 5.0 | 5.0 | 5.0 | 5.0 |
| Phenols, percent wt | 1.07 | .41 | .54 | .53 | .57 | .59 |
| Phenols added | No | Yes | Yes | Yes | Yes | No |
| Phenols total, percent wt | 1.07 | 1.44 | 1.47 | 1.59 | 1.79 | 0.59 |
| pH at 100° F | 12.3 | 11.9 | 11.9 | 11.7 | 11.8 | 12.1 |
| MIBK extraction: | | | | | | |
| MIBK vol. percent Na₃PO₄ | 100 | 100 | 100 | 100 | 100 | 100 |
| Temp., °F | 200 | 200 | 200 | 200 | 200 | 200 |
| Mix time, min | 15 | 15 | 15 | 15 | 15 | 15 |
| Na₃PO₄ product: | | | | | | |
| Phenols, percent wt | .41 | .54 | .53 | .57 | .59 | .26 |
| pH at 100° F | 12.3 | 12.2 | 12.2 | 12.2 | 12.1 | 12.2 |
| Phenol removal, percent | 63 | 63 | 64 | 65 | 67 | 56 |

The data of Table 3 were obtained by adding phenols to the tri-sodium phosphate product solution of each regeneration stage to provide the charge for the next succeeding stage of MIBK extraction relied upon to regenerate the tri-sodium phosphate solution. For example, the Na₃PO₄ product of stage 1 regeneration extraction and comprising 0.41 wt. percent phenols was combined with added phenols to provide a Na₃PO₄ solution for stage 2 regeneration containing 1.44 wt. percent phenols.

The regenerated tri-sodium phosphate was reused as shown by the data of Table 4. These data show that the regenerated phosphate solution was the equivalent of fresh phosphate solution for the removal of phenol from gasoline.

TABLE 4.—REMOVAL OF PHENOLS FROM GASOLINE WITH NEW AND REGENERATED Na₃PO₄ SOLUTIONS

| Experiment number | 100 | 141 |
|---|---|---|
| Charge gasoline: Phenols, p.p.m | 2,200 | 990 |
| Na₃PO₄ solution: | | |
| Na₃PO₄, percent wt | 5 | 5 |
| pH | 12.3 | 12.4 |
| Extraction:[1] | | |
| Treat ratio, Na₃PO₄/vol. percent of gasoline | 20 | 20 |
| Temp., °F | 100 | 100 |
| Phenols: | | |
| In gasoline, p.p.m | 474 | 196 |
| In Na₃PO₄, percent wt | .63 | .31 |
| Phenol removal, percent | 78.5 | 80 |
| MIBK, regeneration:[1] | | |
| MIBK, percent vol. of Na₃PO₄ | 50 | 50 |
| Temp., °F | 200 | 200 |
| Na₃PO₄ phase: | | |
| pH | 12.3 | 12.4 |
| Phenols | .34 | .16 |
| Na₃PO₄ distillation: | | |
| Percent MIBK in 5% overhead fraction | 10 | |
| 95% BTS, pH | 12.3 | 12.4 |
| MIBK distillation:[2] MIBK recovery, percent | 93 | |
| Re-extraction:[1] | | |
| Charge gasoline-phenols, p.p.m | 2,200 | 990 |
| Na₃PO₄ solution: | | |
| Regen. Na₃PO₄ plus overhead from above Na₃PO₄ distillation: | | |
| pH | 12.3 | 12.4 |
| Phenols, percent wt | .35 | .16 |
| Treat ratio, vol. percent gasoline | 25 | 20 |
| Temp., °F | 100 | 100 |
| Phenols: | | |
| In gasoline, p.p.m | 613 | 237 |
| In Na₃PO₄, percent wt | .74 | .44 |
| Phenols removal, percent | 73.0 | 76.3 |

[1] Mechanical shake, 15 min. at temp.
[2] Includes 0.5% MIBK from Na₃PO₄ distillation.

Regeneration of the tri-sodium phosphate solutions by extraction of phenols therefrom with, for example, butyl acetate failed to be a satisfactory method because of reaction of the acetate with the tri-sodium phosphate resulting in a loss of pH thereof. Maintaining the pH of the tri-sodium phosphate solution is a critical aspect of the combination of this invention. It was found that heating of a tri-sodium phosphate solution in the presence of butyl acetate gradually reduces the alkalinity (pH) of the solution and thus degrades its phenol removal efficiency. See Table 5 below.

TABLE 5

[Effect of temperature on pH of Na₃PO₄ solution-extraction with BuAC]

| Experiment number | Na₃PO₄ solution, percent wt. Na₃PO₄ | Temp., °F. | BuAC, percent vol. Na₃PO₄ solution | Contact time, min. | pH of Na₃PO₄ solution at 100° F. |
|---|---|---|---|---|---|
| 63 | 8.6 | 80 | 0 | 30 | 12.8 |
| 63 | 8.6 | 200 | 0 | 30 | 12.4 |
| 63 | 8.6 | 80 | 50 | 30 | 12.2 |
| 63 | 8.6 | 150 | 50 | 30 | 11.2 |
| 63 | 8.6 | 200 | 50 | 30 | 9.7 |
| 74 | 8.6 | 200 | 20 | 30 | 9.8 |

Other solvents such as ethyl ether and isopropyl ether were examined for the regeneration of the phosphate solutions but were found unsatisfactory for reasons of volatility and poor phenol extraction characteristics.

Methanol-water solutions were explored for the removal of phenols from gasoline. Data obtained in these studies are provided in Table 6 below.

TABLE 6.—EXTRACTION OF PHENOLS FROM GASOLINE WITH METHANOL-WATER SOLUTIONS

| Run Number | MeOH/H₂O, percent vol. | Treat ratio, vol. percent gasoline[1] | Phenols in gasoline Original | Phenols in gasoline Product | Percent phenol removal |
|---|---|---|---|---|---|
| 1 | 50/50 | 5 | 2,100 | 1,600 | 24 |
| 2 | 50/50 | 10 | 2,100 | 1,400 | 33 |
| 3 | 50/50 | 20 | 2,100 | 1,100 | 48 |
| 4 | 50/50 | 50 | 2,100 | 560 | 73 |
| 5 | 60/40 | 5 | 1,900 | 1,500 | 21 |
| 6 | 60/40 | 10 | 1,900 | 1,100 | 42 |
| 7 | 60/40 | 20 | 1,900 | 763 | 60 |
| 8 | 60/40 | 50 | 1,900 | 519 | 73 |
| 9 | 70/30 | 5 | 1,900 | 1,400 | 26 |
| 10 | 70/30 | 10 | 1,900 | 1,100 | 42 |
| 11 | 70/30 | 20 | 1,900 | 764 | 60 |
| 12 | 70/30 | 50 | 1,900 | 424 | 73 |
| 13 | 80/20 | 10 | 2,600 | 1,700 | 35 |
| 14 | 80/20 | 20 | 2,600 | 1,200 | 54 |
| 15 | 80/20 | 50 | 2,600 | 370 | 86 |

[1] 30 min. mix time at 100° F.

These data show that fairly large quantities of methanol-water solvent are required for phenol removal. Since regeneration of this solvent mixture requires both distillation of the methanol-water phase and removal of phenols from the water phase by solvent extraction, the combination was not pursued further.

A number of solvents were tested for phenol removal from gasoline and such exploratory studies with various solutions were instrumental in the selection of solutions preferred by this invention. Table 7 presented below is self-explanatory in presenting the result of this work.

TABLE 7.—REMOVAL OF PHENOLS FROM CATALYTIC GASOLINE [3]

| Treating agent (20% vol. treat): | P.p.m. in gasoline RSH-S | P.p.m. in gasoline Phenol | P.p.m. in gasoline Thiophenol | Percent phenol removal |
|---|---|---|---|---|
| None | 160 | 1,100 | 55 | 0 |
| 30% MEA in water [1] | 43 | 482 | 5 | 56 |
| 30% DEA in water [2] | 77 | 666 | 6 | 39 |
| 2% NH₄OH in 30% DEA sol'n | 30 | 670 | 8 | 39 |
| 30% DEA sol'n. saturated with NH₃ [2] | 30 | 555 | 11 | 50 |
| 20% wt. iso-propylamine in water | 15 | 436 | 1 | 60 |
| 20% wt. potassium phosphate in water | 26 | 360 | 5 | 67 |
| 20% wt. dimethyl sulfoxide in water | 53 | 957 | 27 | 13 |
| None | 43 | 1,000 | 28 | 0 |
| Glycerol | 34 | 730 | 10 | 27 |
| 65% triethylene glycol in water | 34 | 390 | 14 | 61 |
| Tetrahydrothiophene 1,1 dioxide | 29 | 163 | 11 | 84 |
| 40% wt. di-isopropanolamine in water | 33 | 594 | 9 | 41 |
| 40% wt. trisodium phosphate in water | 27 | 252 | 10 | 75 |
| 50% wt. tetrahydrothiophene 1,1 dioxide plus 10% DEA | 32 | 407 | 21 | 59 |
| 10% wt. P₂S₅ in water | 33 | 715 | 41 | 28 |
| 30% wt. sodium tetraborate in water | 37 | 716 | 8 | 28 |
| Conc. NH₄OH (29% wt. NH₃) | 32 | 490 | 5 | 51 |

[1] MEA=Monomethynol amine.
[2] DEA=Diethynol amine.
[3] Catalytic Gasoline=Gasoline product of catalytic cracking.

Table 8 below identifies the physical characteristics and properties of MIBK (methyl isobutyl ketone) preferred in the regeneration steps of this invention.

TABLE 8

Methyl iso-butyl ketone $(CH_3)_2$: $CH \cdot CH_2CO \cdot CH_3$
Hexone, 2-methyl-pentanone-4,
4-methyl-pentanone-2

Physical characteristics and properties: A colourless liquid with the odour characteristic of the lower ketones. The commercial product may have a faint butyric residual odour due to slight oxidation.

Molecular weight: 100.16
Boiling point at 760 mm. Hg: 115.90° C.
$dt/dp$ at boiling point: 0.046° C./mm. Hg
Melting point: 80.26° C.
Flash point:
    open cup: 81° F. (24° C.)
    closed cup: 60° F. (15.6° C.)
Specific gravity at 20°/20° C.: 0.8042
$dSG/dt$: 0.00092
Coefficient of cubic expansion at 20°–30° C.: 0.00116
Solubility at 25° C.:
    ketone in water: 1.7 percent w./w.
    water in ketone: 1.9 percent w./w.
Vapour pressure: See table below
Dielectric constant at 20° C.: 13.11
Refractive index at 20° C.: 1.3958
Viscosity:
    at 20° C.: 0.590 cp.
    at 25° C.: 0.546 cp.
Explosive mixtures with air:
    upper limit at 100° C.: 8.00 vol. percent
    lower limit at 50° C.: 1.34 vol. percent
Dilution ratios:
    toluene: 3.6
    petroleum naphtha: 0.75
    benzene: 4.0
    xylene: 2.5
Evaporation rate (n-butyl acetate=100): 165
Calorific value: 8910 cal./g.
Latent heat of evaporation: 87 cal./g.
Specific heat at 20° C.: 0.46 cal./g.
Surface tension at 25° C.: 25.4 dyn./cm.

The invention will now be further described by reference to the following figures.

FIG. 1 provides a series of curves representing the percent removal of phenols from catalytic gasoline with various tri-sodium phosphate solutions.

Figure 2:
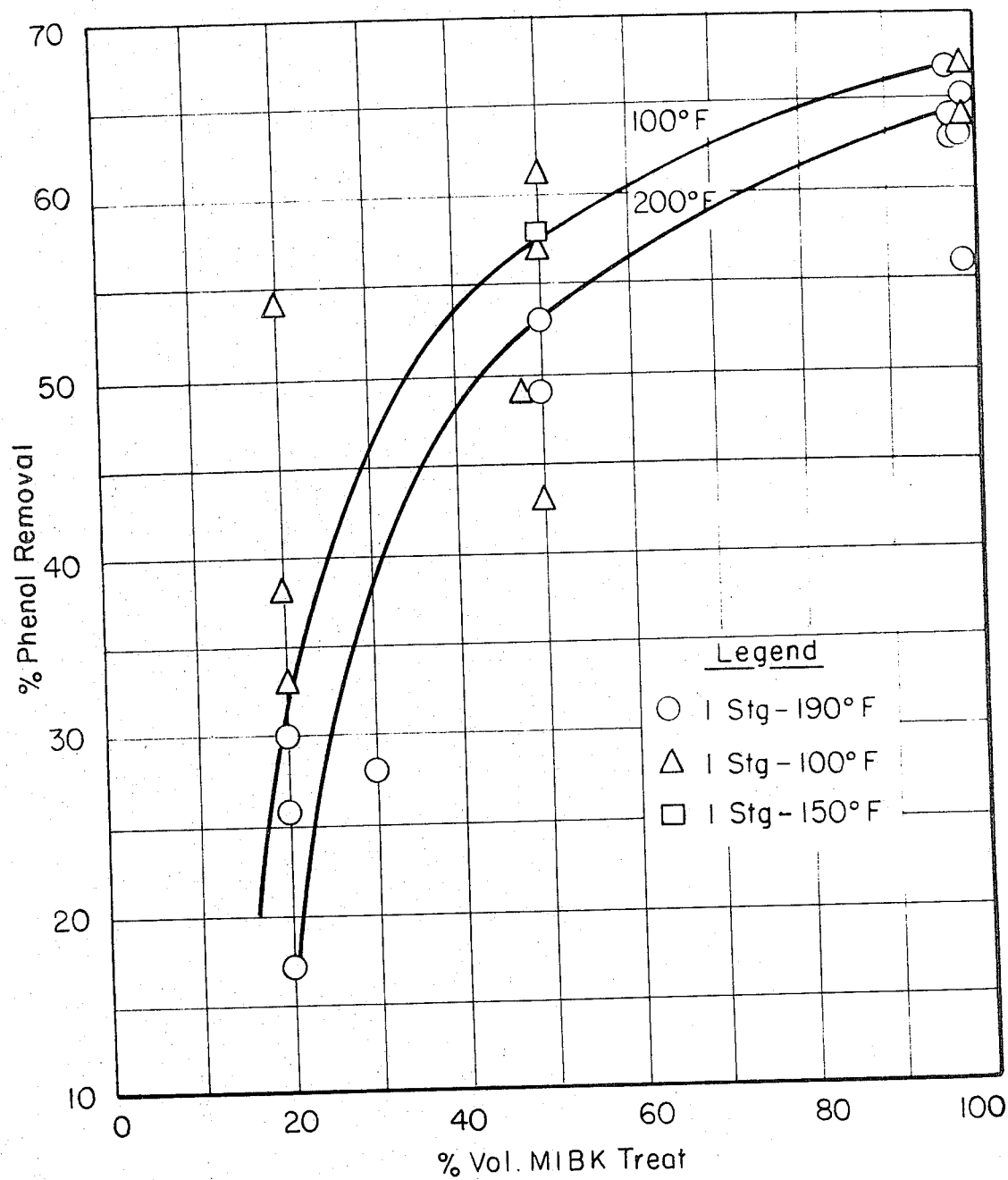

FIG. 2 provides a series of curves representing the percent removal of phenols from tri-sodium phosphate solutions with MIBK at different temperatures.

FIG. 3 provides a series of curves showing the effect of temperature on pH of tri-sodium phosphate solutions.

FIG. 4 provides a processing flow arrangement for treating catalytic gasoline with tri-sodium phosphate and regeneration thereof with MIBK for phenol removal.

Referring now to FIG. 4, catalytic gasoline or a gasoline product of catalytic cracking and boiling in the range of from about $C_5$ hydrocarbons up to about 400 or 425° F. is introduced to the process by conduit 2 communicating with treater vessel 4 wherein the gasoline is countercurrently contacted with a solution tof tri-sodium phosphate introduced thereto by conduit 6. Gasoline thus treated is removed from the upper portion of contact chamber 4 by conduit 8. The gasoline product in conduit 8 may be subjected to a sweetening process for the removal of aliphatic mercaptans as by Merox treatment known in the art. On the other hand, sweetening of the gasoline product of catalytic cracking to remove aliphatic mercaptans is more preferably accomplished before the phenols extraction process of this invention and before passage thereof by conduit 2 to treating vessel 4.

The extract phase comprising phenols including thiophenols in the tri-sodium solution obtained in gasoline treater 4 is removed from the bottom thereof by conduit 10 and passed to an MIBK extractor 12. The tri-sodium phosphate solution with extracted phenols is introduced to the upper portion of vessel 12 maintained at a temperature in the range of about 90 to 120° F. and preferably about 100° F. In vessel 12 the tri-sodium phosphate-phenol solution is countercurrently contacted with a solution of MIBK introduced to the lower portion thereof by conduit 14. An extract phase comprising primarily tri-sodium phosphate solution is recovered from the bottom of extractor 12 by conduit 16 along with some residual phenols incompletely removed during contact with MIBK. The extract phase comprising tri-sodium phosphate conduit 16 is thereafter heated by heater 18 to a temperature of about 220° F. before passage by conduit 20 to the upper portion of a distillation tower 22 known as a tri-sodium phosphate distillation tower. In distillation tower 22 residual MIBK and phenol is removed overhead by conduit 24 and passed to cooler 26 before passage by conduit 28 to drum 30 maintained at a temperature of about 120° F. Reflux material is withdrawn from the lower portion of drum 30 and conveyed by conduit 32 to the upper portion of distillation tower 22. MIBK with adsorbed phenols is removed from drum 30 by conduit 34. MIBK removed overhead from the extractor 12 and containing phenols therein is conveyed by conduit 36 to heater 38 and conduit 40 to MIBK distillation tower 42 maintained at a bottom temperature of about 250° F. The solution of MIBK and phenols in conduit 34 is combined with a main raffinate phase in conduit 36 prior to passing through heater 38. Distillation tower 22 from which tri-sodium phosphate solution is withdrawn from the lower portion thereof by conduit 44 is provided with a reboiler system fed by conduit 46 and containing heater 48 and return conduit 50 for maintaining the lower portion of tower 11 at a temperature of about 230° F. Tri-sodium phosphate solution withdrawn by conduit 44 not recirculated through the reboiler circuit is passed to cooler 52 wherein the temperature thereof is lowered to about 100° F. and thereafter the cool tri-sodium phosphate solution is passed by conduit 54 to storage vessel 56. On the other hand, the thus regenerated tri-sodium phosphate solution may be recycled directly to vessel 6. In distillation tower 42 the solution of MIBK is separated from phenols by maintaining the temperature in the lower portion of the tower at about 250° F. This is accomplished by withdrawing phenols from the bottom of the tower by conduit 60 and recycling a portion thereof through a reboiler circuit comprising conduit 62, heater 64 and return conduit 66. The remaining phenols are recovered from the distillation vessel by conduit 60. An overhead stream comprising MIBK plus a small amount of incompletely removed adsorbed phenols is removed by conduit 68, passed to cooler 70 and thence by conduit 72 to drum 74. In drum 74, reflux fluid is recovered and returned to the upper portion of tower 42 by conduit 76. The remaining solution of MIBK plus any trace amount of absorbed phenols is removed from drum 74 by conduit 78 for passage to storage vessel 80. The thus recovered MIBK solution collected in storage vessel 80 is then returned to MIBK extractor vessel 12 by conduit 14 as hereinbefore described. Furthermore, the tri-sodium phosphate solution collected in storage vessel 56 is recycled to gasoline treater 4 by conduit 6, as hereinbefore described.

In the processing combination above briefly discussed, the gasoline treating step may comprise a combination of liquid phase extraction steps or sequentially arranged vessels or it may include a chamber filled with Raschig rings or Byrl saddles or other extraction tower packing materials to provide a plurality of extraction contact zones within the treating vessel. Similarly, MIBK extractor 12 may be provided with a plurality of contact steps to improve upon the efficiency of the countercurrent liquid phase extraction accomplished therein.

In the processing scheme of this invention, gasoline treater vessel 4 is operated at a temperature in the range of from about 90 to about 110° F. and under sufficient pressure to permit cascade of the tri-sodium phosphate solution with phenols at least to MIBK extractor 12. MIBK extraction zone or vessel 12 is maintained at a temperature in the range of from about 100° F. to about 200° F. where MIBK enriched with extracted phenols is removed from the tower as by conduit 36. The tri-sodium phosphate distillation tower 22 is maintained at a bottom temperature in the range of from about 215° F. to about 250° F. and a top temperature sufficient to carry the MIBK overhead.

The MIBK distillation tower 42 is maintained at a bottom temperature sufficient to distill MIBK overhead and permit recovery of phenols from the bottom thereof. This temperature of course will vary with pressure employed in the process.

It is further contemplated operating the process at a pressure sufficiently elevated in at least the gasoline extraction step in vessel 4 to permit cascade of various solutions to and through downstream contact zones comprising vessels 12, 22 and 42. Thus, only sufficient pressure may be employed to overcome pressure drop of the processing combination.

Having thus provided a general discussion of the improved combination of this invention and presented specific embodiments going to the essence thereof, it is to be noted that no undue restrictions are to be imposed by reasons thereof except as defined by the following claims.

I claim:
1. A method of treating a gasoline product of catalytic cracking containing phenols and sulfur compounds which comprises:
   (a) treating the gasoline product under conditions to remove aliphatic sulfur compounds,
   (b) contacting the gasoline product freed of aliphatic sulfur compounds with a phosphate solution having an alkalinity value of at least 11 and recovering a gasoline product reduced in phenols,
   (c) regenerating said phosphate solution by extracting phenols therefrom with a ketone solution having a greater affinity for phenols than said phosphate solution and reusing phosphate solution thus regenerated as recited in (b) above,
   (d) separating phenols from said ketone solution by distillation and reusing ketone solution thus freed of phenols as recited in step (c).
2. A method for removing phenols from catalytic gasoline which comprises:
   (a) contacting catalytic gasoline containing phenols with a phosphate solution having an alkalinity value in the range of 11 to about 13 under temperature conditions causing phenols to transfer from said gasoline phase to said phosphate solution phase,
   (b) recovering gasoline product from which phenols were removed separately from a phosphate solution containing phenols,
   (c) removing phenols from said recovered phosphate solution by contact with a ketone solution having an affinity for said phenols without significantly reducing the alkalinity of said phosphate solution,
   (d) reusing phosphate solution which has had phenols removed therefrom as recited in (a),
   (e) distilling said ketone solution containing phenols to separate phenols from said ketone solution, and
   (f) reusing said distilled ketone solution to recover additional phenols as recited in step (c).
3. The method of claim 2 wherein the ratio of phosphate solution to gasoline during said phenol extraction is in the range of 15 to 20 percent volume of gasoline.
4. The method of claim 2 wherein the phosphate solution obtained after extraction of phenols therefrom is distilled to effect separation of ketone solution therefrom including phenols and the distilled phosphate solution is then used to extract phenols from gasoline product of catalytic cracking.
5. The method of claim 2 wherein the phosphate solution contains up to about 13% $Na_3PO_4$ in water at 100° F.
6. The method of claim 2 wherein the extraction of phenols from the catalytic gasoline is effected at a temperature in the range of 90 to about 110° F.
7. The method of claim 2 wherein phenols are separated from said phosphate solution at a temperature of about 100° F.
8. The method of claim 2 wherein aliphatic mercaptans are converted to disulfides, soluble in said catalytic gasoline prior to extracting phenols and thiophenols with said phosphate solution.
9. The method of claim 2 wherein aliphatic mercaptans are converted to disulfides, soluble in said catalytic gasoline after extracting phenols from said catalytic gasoline with said phosphate solution.
10. The method of claim 2 wherein said phosphate solution is tri-sodium phosphate and said ketone solution is methyl isobutyl ketone.

References Cited
UNITED STATES PATENTS

| | | | |
|---|---|---|---|
| 2,868,722 | 1/1959 | Brooks, Jr. et al. | 208—263 |
| 2,454,383 | 11/1948 | Heid | 208—263 |
| 2,603,590 | 7/1952 | Anderson | 208—263 |
| 3,071,541 | 1/1963 | Stenzel | 208—263 |

DELBERT E. GANTZ, Primary Examiner

J. M. NELSON, Assistant Examiner

U.S. Cl. X.R.
208—192, 193

UNITED STATES PATENT OFFICE
CERTIFICATE OF CORRECTION

PO-1050 (5/69)

Patent No. 3,775,306          Dated November 27, 1973

Inventor(s) KENNETH F. HAYDEN

It is certified that error appears in the above-identified patent and that said Letters Patent are hereby corrected as shown below:

| | | |
|---|---|---|
| Column 2, line 62 | : | In heading of Table 1a "PHOSPAHTE" should be --PHOSPHATE-- |
| Cols. 3 & 4, line 26 | : | Under column "Charge, p.p.m." : "36,00" should be --3600-- |
| Cols. 3 & 4, line 27 | : | "36.00" should be --3600-- |
| Column 5, line 2 | : | In heading of Table 3 : "Pyenols" should be --Phenols-- |
| Column 7, line 65 | : | "tof" should be --of-- |

Signed and sealed this 23rd day of April 1974.

(SEAL)
Attest:

EDWARD M.FLETCHER,JR.
Attesting Officer

C. MARSHALL DANN
Commissioner of Patents